US006228455B1

(12) United States Patent
Huang et al.

(10) Patent No.: US 6,228,455 B1
(45) Date of Patent: May 8, 2001

(54) OPTICAL RECORDING MEDIUM

(75) Inventors: Chien-Liang Huang, Taoyuan; Wen-Yih Liao, Taichung; Chin-Sen Chen, Hsinchu; Don-Yau Chiang, Hsinchu Hsien; Der-Ray Huang, Hsinchu; Lii-Chyuan Tsai, Hsinchu Hsien; Tsai-Chu Hsiao, Chung-Li, all of (TW)

(73) Assignees: Industrial Technology Research Institute, Hsinchu; CMC Magnetics Co., Taipei, both of (TW)

( * ) Notice: Subject to any disclaimer, the term of this patent is extended or adjusted under 35 U.S.C. 154(b) by 0 days.

(21) Appl. No.: 09/249,059

(22) Filed: Feb. 12, 1999

(30) Foreign Application Priority Data

Aug. 18, 1998 (TW) .................................................. 87113547

(51) Int. Cl.⁷ ....................................................... B32B 3/02
(52) U.S. Cl. ........................ 428/64.1; 428/64.4; 428/64.8; 428/457; 428/913; 430/270.16; 430/270.18; 430/270.2; 430/945; 369/283; 369/288
(58) Field of Search .................................. 428/64.1, 64.2, 428/64.4, 64.8, 457, 913; 430/270.14, 270.16, 270.18, 270.2, 495.1, 945; 369/283, 288

(56) References Cited

U.S. PATENT DOCUMENTS

| 5,817,389 | * | 10/1998 | Ono | 428/64.1 |
| 5,871,882 | * | 2/1999 | Schmidhalter | 430/270.13 |
| 5,879,772 | * | 3/1999 | Morishima | 428/64.1 |
| 5,879,773 | * | 3/1999 | Hatwar | 428/64.1 |

* cited by examiner

*Primary Examiner*—Elizabeth Evans
(74) *Attorney, Agent, or Firm*—Thomas, Kayden, Horstemeyer & Risley (57) ABSTRACT

A structure of an optical recording medium that mainly includes a first dielectric layer, a dye layer, a second dielectric layer, and a reflective layer formed on a substrate in sequence, and a method for fabricating an optical recording medium of the foregoing structure. The additional dielectric layers of the optical recording medium, instead of a quencher used in a conventional optical recording medium, increase the lifetime of a dye layer and reduce the fabrication cost. Furthermore, the additional dielectric layers are capable of isolating the dye layer from oxygen and moisture to enhance the lightfastness of the dye layer.

23 Claims, 7 Drawing Sheets

OPTICAL RECORDING MEDIUM

CROSS-REFERENCE TO RELATED APPLICATION

This application claims the priority benefit of Taiwan application serial no. 87113547, filed Aug. 18, 1998, the full disclosure of which is incorporated herein by reference.

BACKGROUND OF THE INVENTION

1. Field of the Invention

This invention relates to an optical recording medium, and more particularly, to a recordable optical recording medium.

2. Description of Related Art

Since the growth of multi-media applications for computers is raised according to the increasingly advanced computer hardware, recording media that are capable of storing a mass of data are needed. An optical compact disc (CD) has been currently utilized as a medium for storing a mass of data, such as multi-media programs and files because of its capacity and data-retrieving rate.

CDs can be divided into three categories, read-only CD, recordable CDs, and rewritable CDs mainly. The read-only CD, or a ca-called CD read-only memory (CD-ROM), is developed based on CD digital audio (CD-DA) and is capable of storing 650-Megabyte (MB) data. Because the data stored on a CD-ROM is burned onto a surface of the CD-ROM during the fabrication process, users are not allowed to modify and edit the stored data. Hence, a recordable optical recording medium, CD-recordable or CD-R, was introduced into the market in 1988.

Figure 1:
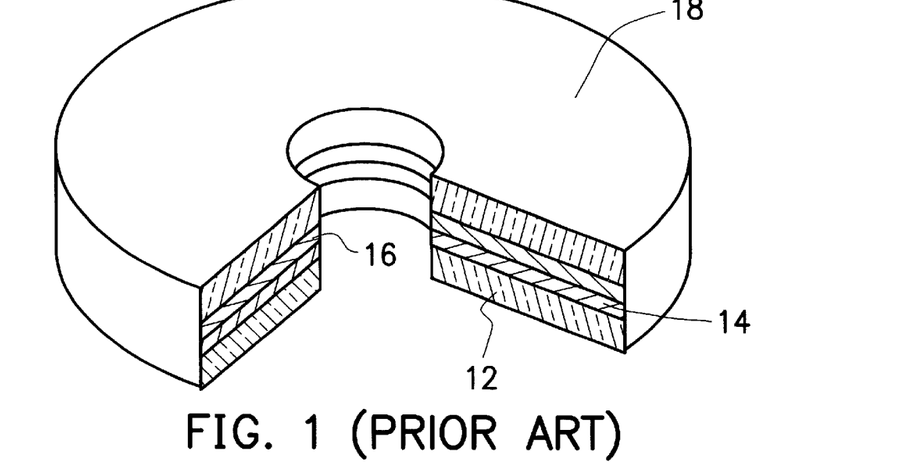
FIG. 1 is a perspective cross-sectional view of an optical recording medium.

The structure of a CD-R is similar to what of a traditional CD as shown in FIG. 1. Referring to FIG. 1, a conventional CD-R consists of a 1.2-mm grooved polycarbonate (PC) substrate 12, a 0.2-$\mu$m dye layer 14, a metallic reflective layer 16, and a protective layer 18. The metallic reflective layer 16 is gold or silver formed by a vacuum sputtering process, and the protective layer 18 is an ultraviolet-cured resin formed by spin-coating. The dye layer 14, which is not present in a conventional CD-ROM, reacts with laser beams to record data on the CD-R. Compared with a conventional CD-R, besides the lack of a dye layer 14, a conventional CD-ROM has pre-formed data pits on the substrate 12 before the formation of other components.

The dye layer 14 of a CD-R has certain requirements including:

1. capability of absorbing the laser beam and converting the laser beam into heat, wherein the heat is then used to heat the dye layer 14, melt and dissolve the dye layer, and form data pits on the substrate 12;
2. property of a excellent process resolvability for a spin-coating process; and
3. stability on environment to keep the stored data for a long period of time.

The dye layer in most currently available CD-Rs include cyanine, phthalocyanine, and azo-metal complex, wherein cyanine is the most common material used to form a dye layer in a CD-R because of its advantages include non-toxicity, metal-likeness, film-formability, and excellent resolvability. In the fabrication process of a conventional CD-R with a cyanine dye layer, a quencher is normally added to enhance the poor lightfastness of cyanine. Even though the method, which is provided in U.S. Pat. No. 5,328,741, U.S. Pat. No. 5,328,802 and U.S. Pat. No. 5,336,584, is able to last the lifetime of dye layers of CD-R by adding a quencher, there are still drawbacks. The added quencher costs several times than the cyanine, so that the fabrication cost is increased. Since the volatility and the resolvability of quencher are relatively poor, that makes it difficult to processed. In addition, the crystallization of quencher occurring in the dye layer due to an improper process degrades the recording capability of the dye layer.

According to the foregoing, a conventional method that increases the lightfastness of a dye layer by adding quencher is not cost effective and cost competitive, and tends to damaging the dye layer.

SUMMARY OF THE INVENTION

It is therefore an objective of the present invention to provide a method and a structure for fabricating an optical recording medium that includes forming an additional dielectric layer, instead of adding a quencher, to increase the lifetime of a dye layer. The additional dielectric layer is capable of preventing the dye layer from oxygen and moisture to enhance the lightfastness of the dye layer. The method of the invention is also able to reduce the fabrication cost by not adding expensive quencher.

In accordance with the foregoing and other objectives of the present invention, the invention provides a structure of an optical recording medium that includes a dielectric layer, a dye layer, and a reflective layer formed on a substrate in sequence. The dielectric layer isolates the dye layer from oxygen and moisture to improve the lightfastness and the thermostability of the dye layer. Furthermore, the dielectric layer further increases the lifetime of the dye layer.

In addition, another dielectric layer can be added between the reflective layer and the dye layer to prevent the dye layer from being evaporated by a long-term illumination.

A method for fabricating the forgoing optical recording medium of the invention is also porvided.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention provides a new structure of an optical recording medium and a method for fabricating the optical recording medium of the structure according to the invention.

Figure 2A:
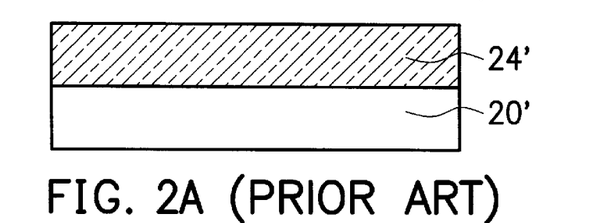
FIGS. 2A through 2G are fragmental cross-sectional views showing comparison between the structure of a conventional optical recording medium and the optical recording medium of a preferred embodiment according to the invention.
Figure 2B:
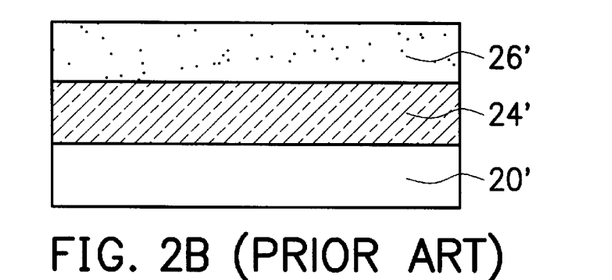
Figure 2C:
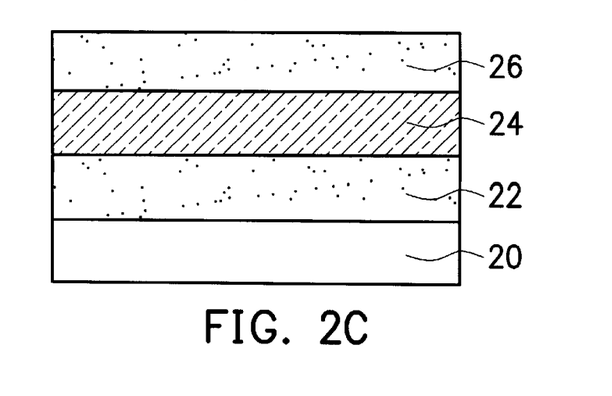
Figure 2D:
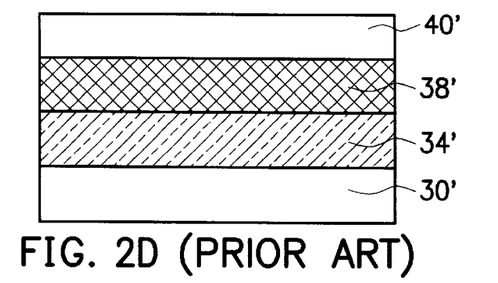
Figure 2E:
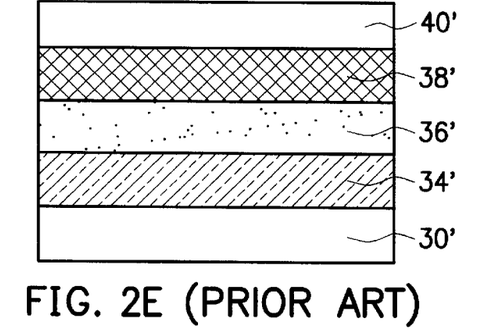
Figure 2F:
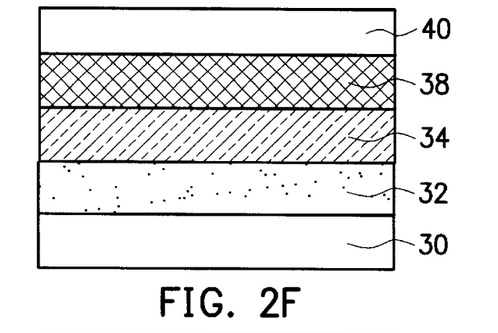

Referring to FIG. 2F, a dielectric layer 32, a dye layer 34, and a reflective layer 38 are formed on a substrate 30 in sequence, wherein the dielectric layer 32 is one selected from ZnS, $SiO_2$, $Si_3N_4$, $Al_2O_3$, $Ta_2O_3$. and other materials of the similar properties. The thickness of the dielectric layer 32 is about 100 Å to 1000 Å, and is preferably about 300 Å to 800 Å. The dye layer 34 is one selected from cyanine, phthalocyanine, azo-metal complex, and other materials of the similar properties, wherein the thickness of the dye layer 34 is about 1000 Å to 5000 Å, preferably about 1500 Å to 3000 Å. The reflective layer 38 is one selected from gold, silver, aluminum, nickel, titanium, and other materials of the similar properties, wherein the thickness of the reflective layer is about 500 Å to 2000 Å, preferably about 500 Å to 1000 Å.

Figure 2G:
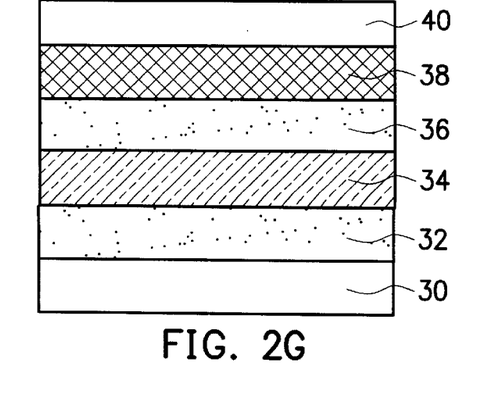

The dielectric layer 32 between the substrate 30 and the dye layer 34 prevents the dye layer 34 from oxygen and moisture to improve the lightfastness and the thermal stability, and further to last the lifetime of the dye layer 34. An additional dielectric layer 36 can be placed between the dye layer 34 and the reflective layer 38, as shown in FIG. 2G, to prevent the dye layer from being evaporated by a long-time exposure.

Two examples are given as following to describe the processes and methods of fabricating the foregoing structures of the invention.

EXAMPLE ONE

FIG. 2C is a fragmental cross-sectional view showing the structure of an optical recording medium of the invention, wherein the dye layer 24 of the optical recording medium of the invention is between two dielectric layers 22 and 26, and on a substrate 20. The substrate 20 is placed in a radio frequency (RF) sputter for forming a dielectric layer 22, wherein the preferred condition within the RF sputter includes 50-watt power and argon pressure about $3\times10^{-3}$ torr. The thickness of the dielectric layer 22 is about 500 Å preferably. The substrate 20 normally includes polycarbonate (PC), and the dielectric layer 22 includes ZnS—$SiO_2$.

A dye layer 24 is then spin-coated on the dielectric layer 22 by spin coater, wherein the dye solution is 3 wt % 2,2,3,3-tetraflouropanol solution of cyanine. The dye layer 24 is formed by using a spin-coating method, wherein the preferable thickness of the dye layer 24 is about 1000 Å to 2500 Å thick at the end of drying.

The substrate 20 is place0d into a RF sputter again, wherein the preferred condition within the RF sputter includes 50-watt power and argon pressure about $3\times10^{-3}$ torr. The dielectric material (such as ZnS—SiO2) is vacuum deposited onto the dye layer 24 as another dielectric layer 26. The preferable thickness of the dielectric layer 26 is about 500 Å.

EXAMPLE TWO

The structure of an optical recording medium of the invention is shown in FIG. 2F.

Referring to FIG. 2F, a substrate 30 is placed in a RF sputter wherein the condition is 50-watt power and the pressure is about $3\times10^{-3}$ torr. The dielectric material (such as ZnS—SiO2) is vacuum deposited onto the dye layer 30 as another dielectric layer 32. The thickness of the dielectric layer 32 is about 500 Å preferably. The substrate 30 normally includes PC, and the dielectric layer 22 includes ZnS—$SiO_2$.

A dye layer 34 is then formed on the dielectric layer 32, wherein the dye solution 3 wt % 2,2,3,3-tetrafluoropropanol solution of cyanine. The dye layer 34 is formed by using a spin-coating method, wherein the preferable thickness of the dye layer 24 is about 1000 Å to 2500 Å.

A reflective layer 38 of about 800 Å thick is formed on the dye layer 34 by a sputtering deposition process, wherein the reflective layer 38 can be gold, silver, or other materials of the similar properties. The top surface of the optical medium is then covered with UV-cured resin as a protective layer 40, wherein the protective layer 40 is ultraviolet curable and about 1 $\mu$m in thickness preferably.

Among FIGS. 2A through 2G, FIGS. 2C and 2F are cross-sectional views showing the structures of optical recording media according to the invention. FIGS. 2A and 2D, which are cross-sectional views showing the structures of conventional optical recording media, are listed for the comparison with the structures of the optical recording media of the invention.

The structure 2A through are exposed to 7.4 mW/cm$^2$ Xe-lamp for several hours, the reflectivity (R), and the optical density (OD) of the structures shown in FIGS. 2A through 2G are measured every two hours. The measured data are then analyzed to signalize the improvement according the invention.

Figure 3:
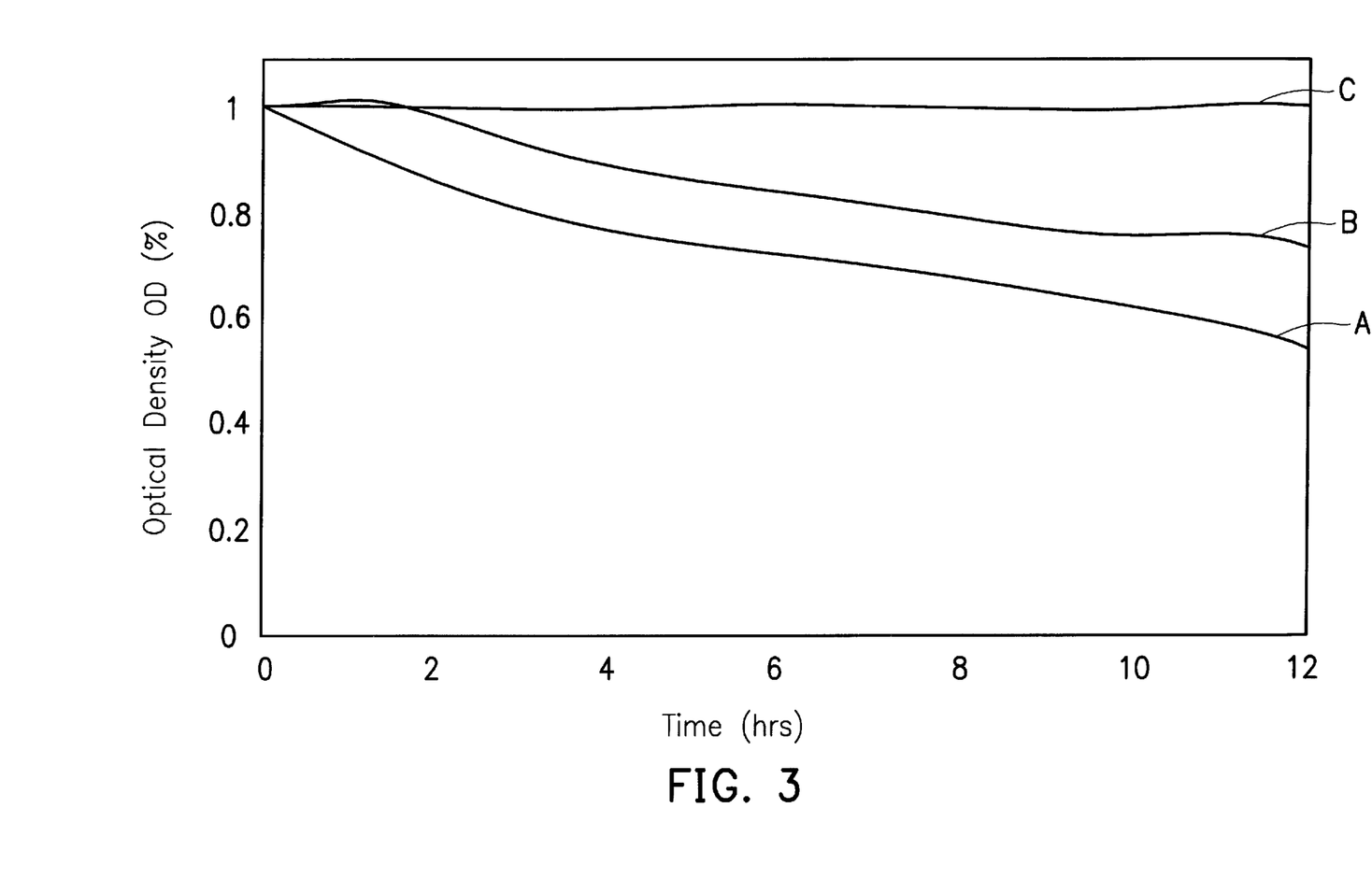
FIG. 3 is a graphic plot showing the relationship of optical densities of the structures shown in FIGS. 2A through 2C versus the exposure duration.

FIG. 3 is a graphic plot showing the normalized OD, OD (%), obtained from the structures shown in FIGS. 2A through 2C. Referring to FIG. 3, the Y axis represents OD in percentage (%), which is a normalized measurement, a ratio of $OD_i$ to $OD_o$. The $OD_i$ is the measured OD under the foregoing exposure for i hours, and the $OD_o$ is a measured OD without the presence of the foregoing exposure. As shown in FIG. 3, curve A, the OD value decreases with the increasing exposure time for structure 2A (shown in FIG. 2A).

There are two reasons causing the OD value to decrease rapidly:

1. Dye in the dye layer 24' is vaporized by the exposure; and
2. Dye in the dye layer 24' is degenerated because of reacting with oxygen after exposure.

Referring to FIG. 2B, a dielectric layer 26' including ZnS—$SiO_2$ is deposited on the dye layer 24' to prevent the vaporization of the dye in the dye layer 24' in a long-time exposure. As a result, the measured OD, curve B in FIG. 3, still decreases with the increasing exposure time for structure, but in a smoother rate, that is the protection over the dye layer 24', the lightfastness, is improved. Referring to FIG. 2C, which shows the structure of the invention, a dielectric layer 22, a dye layer 24, and another dielectric layer 26 are formed on a substrate 20 in sequence. The OD measured on the structure of the invention is represented by curve C in FIG. 3, wherein the curve C, the measured OD, remains almost unchanged after 12-hour exposure.

According the foregoing, the dielectric layer 22 of the structure according to the invention prevents the oxygen from osmosing to the dye layer 24 through the substrate 20, that is, the invention actually improves the lightfastness of the dye layer 24.

Figure 4:
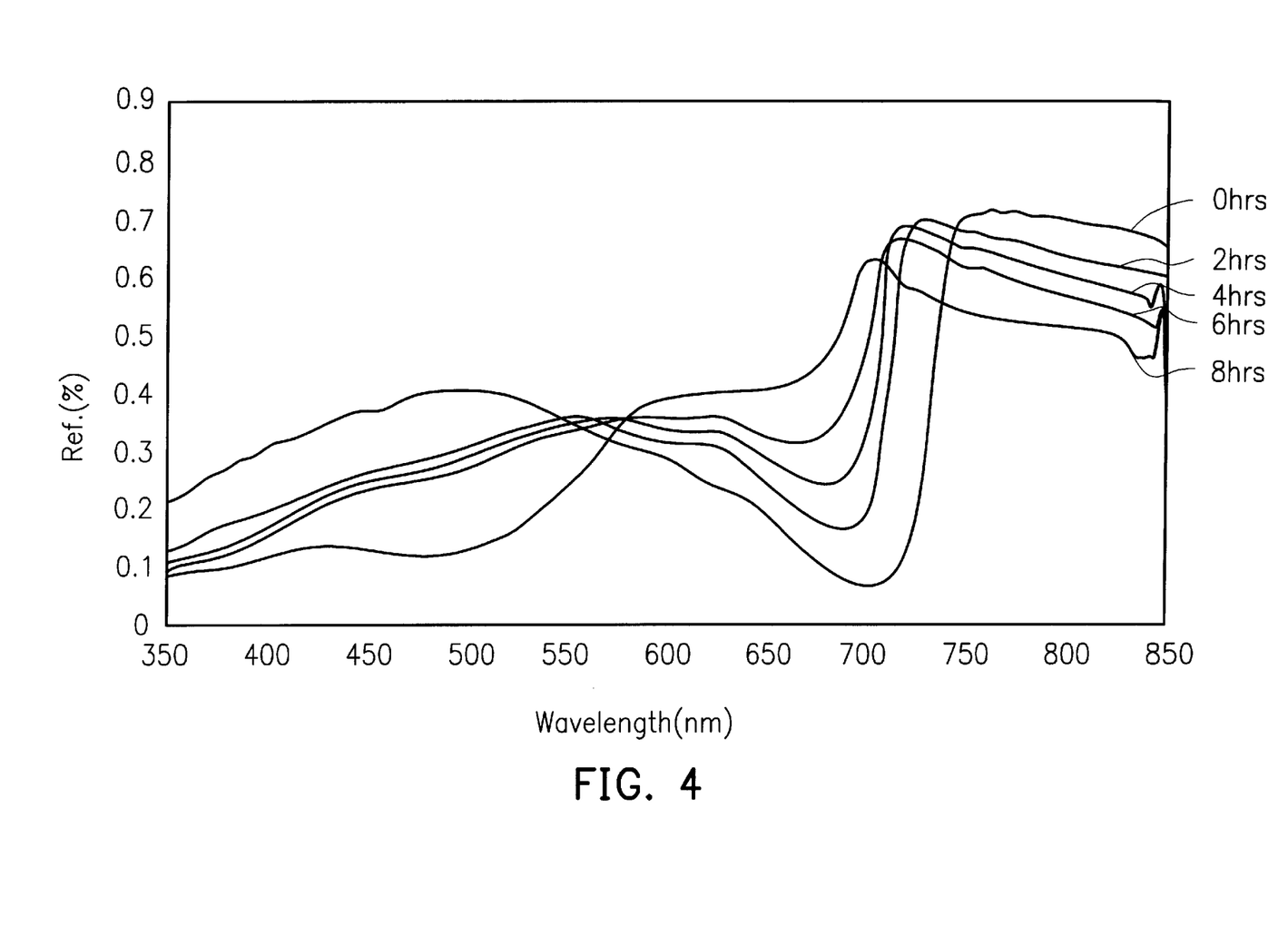
FIG. 4 is a reflection spectrum showing the reflectivity of the structure shown in FIG. 2D versus the exposure duration, where the exposure duration difference between two adjacent curves is 2 hours.
Figure 5:
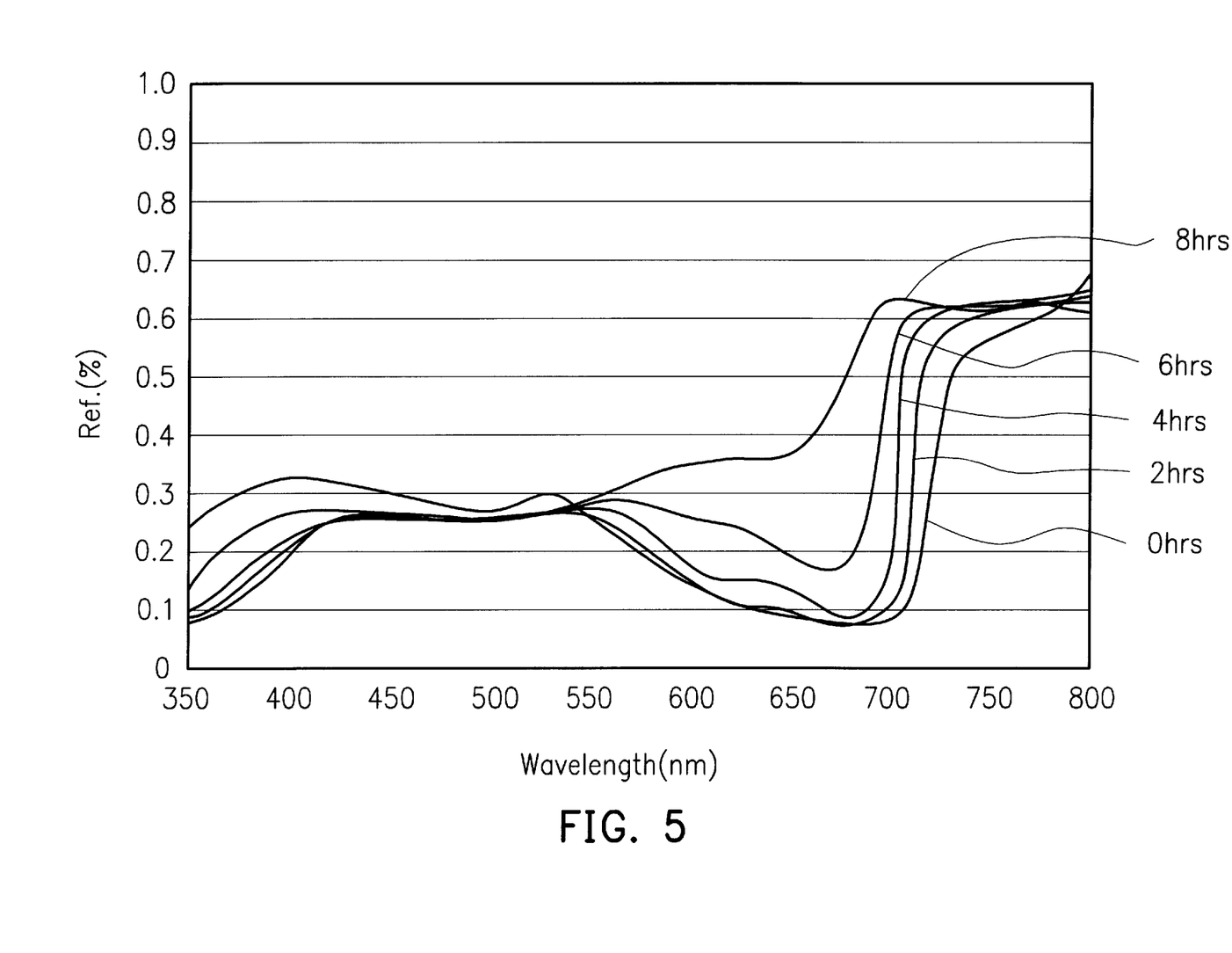
FIG. 5 is a reflection spectrum showing the reflectivity of the structure shown in FIG. 2E versus the exposure duration where the exposure duration difference between two adjacent curves is 2 hours.
Figure 6:
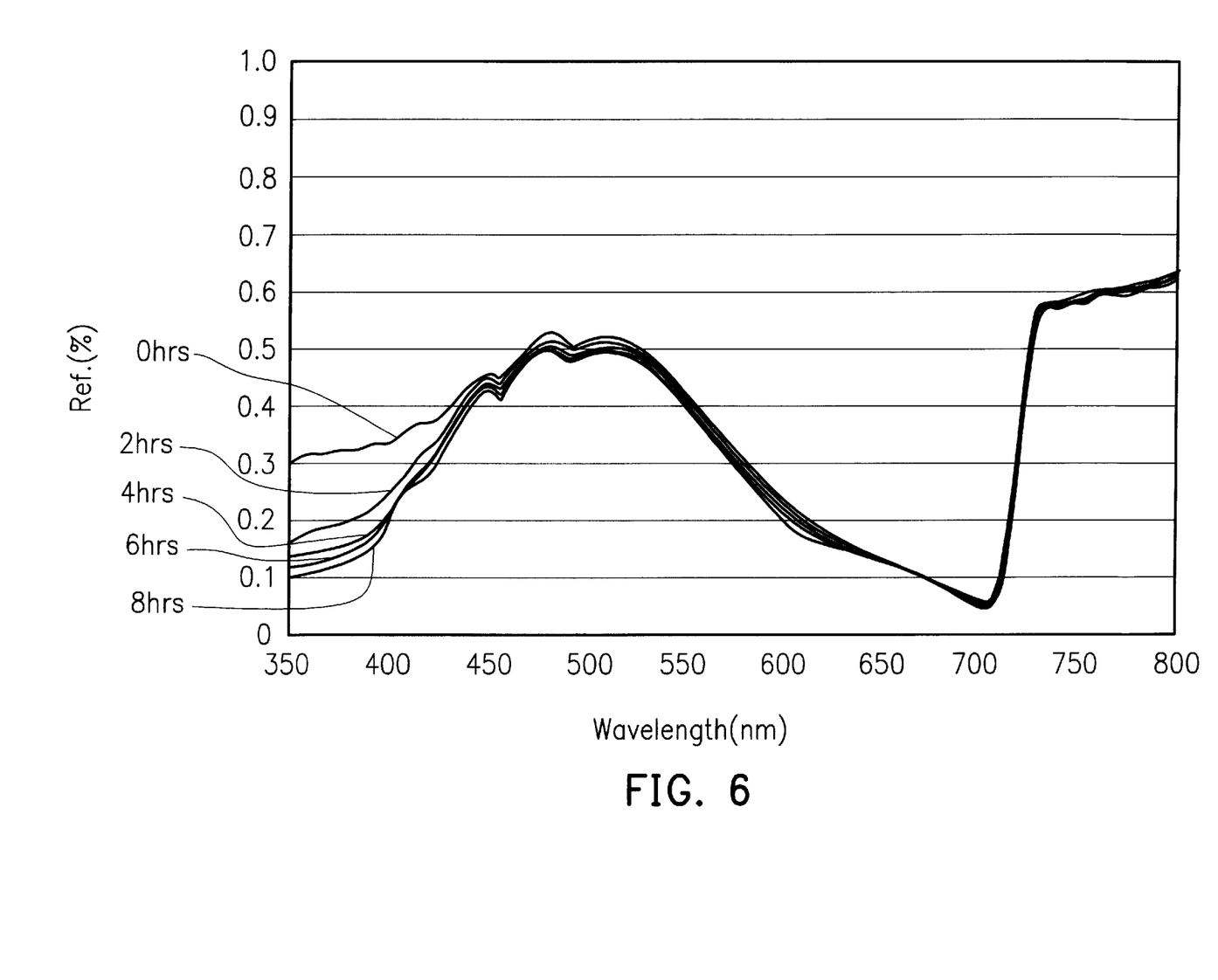
FIG. 6 is a reflection spectrum showing the reflectivity of the structure shown in FIG. 2F versus the exposure duration where the exposure duration difference between two adjacent curves is 2 hours.
Figure 7:
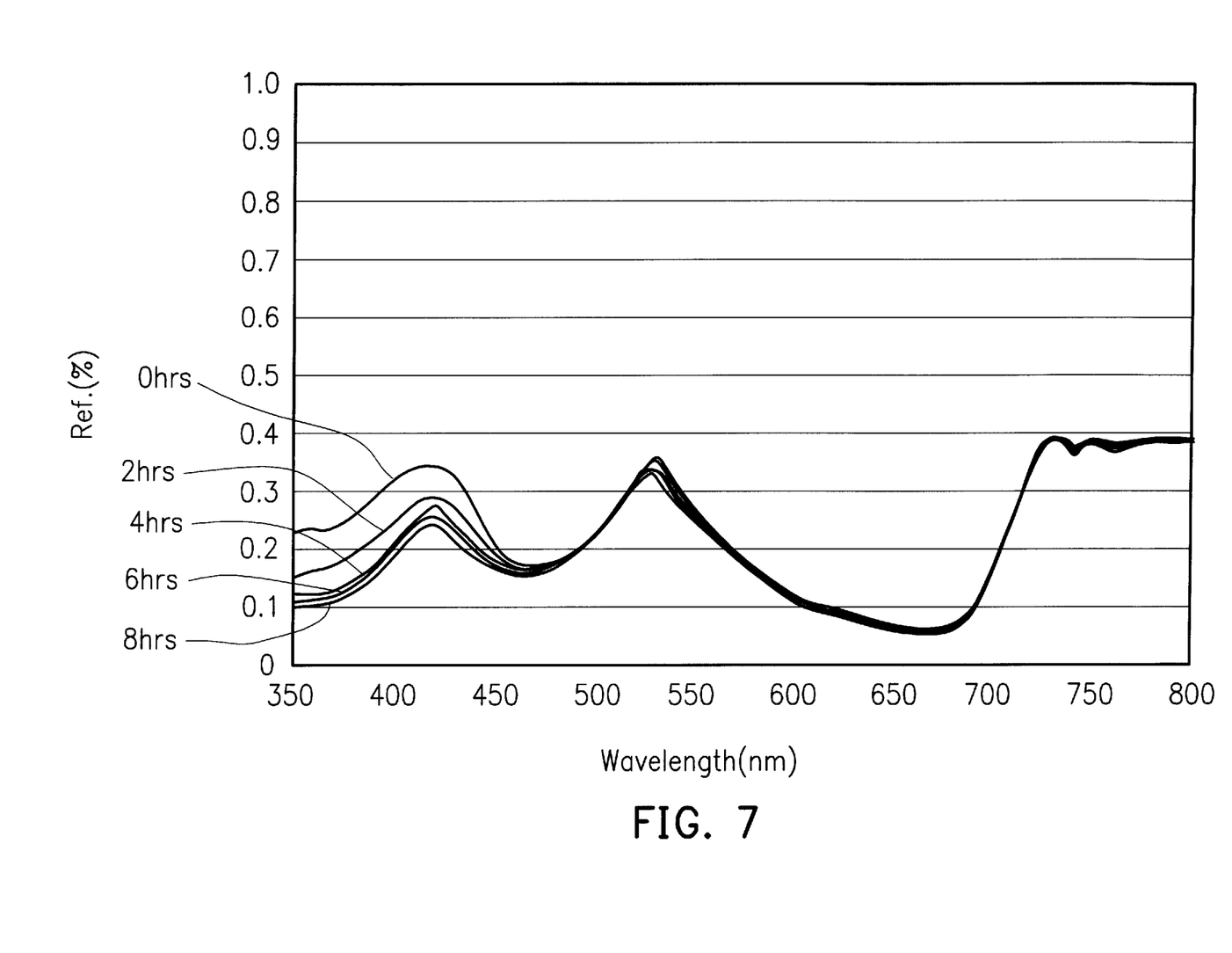
FIG. 7 is a reflection spectrum showing the reflectivity of the structure shown in FIG. 2G versus the exposure duration where the exposure duration difference between two adjacent curves is 2 hours.

FIGS. 4 and 6 show the reflection spectra of a conventional optical recording medium (shown in FIG. 2D) and the structure according to this invention (shown in FIG. 2F) at different exposure time where the exposure duration difference between two adjacent curves is 2 hours. By comparing FIGS. 4 and 6, it is obvious that the reflectivity (R) of the structure of our invention (shown in FIG. 2F) remains almost unchanged after eight-hour exposure. It remains 65% reflectivity at wavelength 780 nm. Referring to the wavelengths covered in the graphic plot in FIG. 6, the optical recording medium of the invention can further used as a structure of a DVD-R.

According to the foregoing, the specificity of the invention is to add a dielectric layer between the substrate and the dye layer of an optical recording medium, instead of adding quencher, to improve the lightfastness of the dye layer and reduce the fabrication cost.

It is also a specificity of the invention to adding a dielectric layer between the substrate and the dye layer to ensure an excellent reflectivity of the dye layer after under a long-time exposure.

It is still a specificity of the invention to improve the stability of the dye layer for lasting the lifetime of the optical recording medium.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A structure of an optical recording medium based on a substrate, the structure of an optical recording medium comprising:

a first dielectric layer directly formed on the substrate for preventing oxygen and moisture diffusing from outside, wherein the first dielectric layer is about 100 Å to 1000 Å thick;

a dye layer formed on the first dielectric layer for recording data; and a reflective layer formed on the dye layer.

2. The structure of the optical recording medium of claim 1 further comprises a second dielectric layer formed between the dye layer and the reflective layer.

3. The structure of the optical recording medium of claim 1 further comprises a protective layer formed on the reflective layer.

4. The structure of the optical recording medium of claim 1, wherein the first dielectric layer is one selected form a group consisting of ZnS, $SiO_2$, $Si_3N_4$, $Al_3O_2$, ZnS—$SiO_2$ and $Ta_2O_3$.

5. The structure of the optical recording medium of claim 1, wherein the dye layer is one selected from a group consisting of cyanine, phthalocyanine, and azo-metal complex.

6. The structure of the optical recording medium of claim 5, wherein the dye layer is about 1000 Å to 5000 Å thick.

7. The structure of the optical recording medium of claim 1, wherein the dye layer is an optical recording dye.

8. The structure of the optical recording medium of claim 1, wherein the reflective layer is one selected from a group consisting of gold, silver, aluminum, nickel, and titanium.

9. The structure of the optical recording medium of claim 1, wherein the reflective layer is about 500 Å to 2000 Å thick.

10. A method for fabricating an optical recording medium based on a substrate, the method comprising steps of:

forming a first dielectric layer directly on the substrate, wherein the first dielectric layer is used to prevent oxygen and moisture diffusing from outside of the optical recording medium;

forming a dye layer on the first dielectric layer, wherein the dye layer is used for recording data, wherein the dye layer is about 1000 Å to 5000 Å thick; and forming a reflective layer on the dye layer.

11. The method of claim 10 further comprises a step of forming a second dielectric layer between the dye layer and the reflective layer.

12. The method of claim 10 further comprises a step of forming a protective layer on the reflective layer.

13. The method of claim 12, wherein the protective layer is about 1 $\mu$m thick.

14. The method of claim 10, wherein the first dielectric layer is one selected from a group consisting of ZnS, $SiO_2$, $Si_3N_4$, $Al_3O_2$, ZnS—$SiO_2$ and $Ta_2O_3$.

15. The method of claim 14, wherein the dielectric layer is about 100 Å to 1000 Å thick.

16. The method of claim 10, wherein the dye layer is one selected from a group consisting of cyanine, phthalocyanine, and azo-metal complex.

17. The method of claim 10, wherein the reflective layer is one selected from a group consisting of gold, silver, aluminum, nickel, and titanium.

18. The method of claim 10, wherein the reflective layer is about 500 Å to 2000 Å thick.

19. The method of claim 10, wherein the step of forming the dye layer includes spin-coating.

20. The method of claim 10, wherein the step of forming the first dielectric layer includes sputtering deposition.

21. The method of claim 10, wherein the step of forming the reflective layer includes sputtering deposition.

22. The method of claim 11, wherein the step of forming the second dielectric layer includes sputtering deposition.

23. A structure of an optical recording medium formed on a substrate, the structure of the optical recording medium comprising:

a first dielectric layer directly on the substrate for preventing oxygen and moisture diffusing from outside of the optical recording medium, wherein the first dielectric layer is about 100 Å to 1000 Å thick;

a dye layer on the first dielectric layer for recording data;

a second dielectric layer on the dye layer suppressing the vaporization of the dye layer occurring under a long-time exposure;

a reflective layer on the second dielectric layer; and a protective layer on the reflective layer for providing protection to the optical recording medium.

* * * * *